United States Patent Office 3,263,645
Patented August 2, 1966

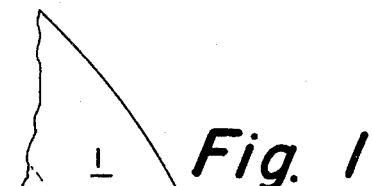
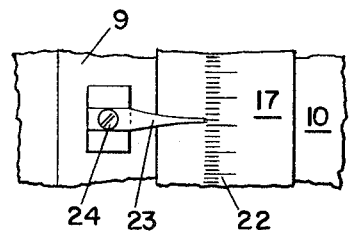
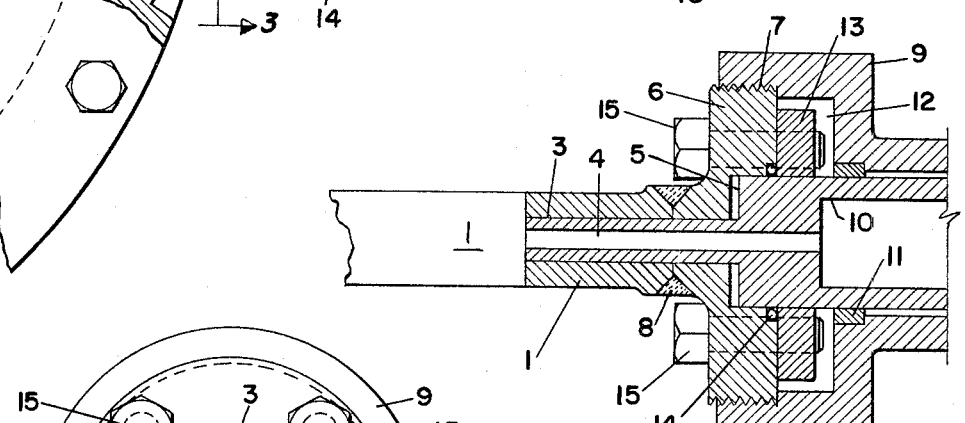
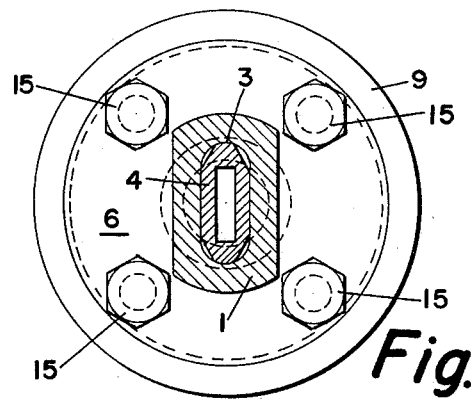
INVENTOR.
WILLIAM B. HANSEL
BY George L. Church
ATTORNEY

1

3,263,645
ADJUSTING MECHANISM
William B. Hansel, Media, Pa., assignor to Sun Oil Company, Philadelphia, Pa., a corporation of New Jersey
Filed Dec. 30, 1963, Ser. No. 334,523
2 Claims. (Cl. 116—124)

This invention relates to an adjusting mechanism, and more particularly to a manually-operable mechanism which provides a sliding adjustment of one member with respect to another member.

It is often desired to move one rather heavy member relative to another through a very small range of adjustment, such as about 0.01 inch, the total range of adjustment being magnified or "geared up" in such a way that the manually-operable element (which latter is operated to effect the adjustment) must be moved through a distance which is large as compared to the distance through which the adjusted member moves. In this way, an extremely fine adjustment of the adjusted member is made possible.

A typical utilization of the mechanism of the invention will be described herein, merely by way of example. It will be appreciated that the mechanism can be used, however, in many other environments.

In a certain type of chemical reactor, known as a wave engine, a disc carrying an elongated tube rotates within a stationary port ring, and a high pressure driving gas is injected into the tube (thereby to set up shock waves therein) by means of one or more nozzles positioned in the port ring. The nozzles are slidably mounted in the port ring. To bring about optimum operation of the engine, it is necessary that the nozzle be slidably adjustable (over a small range) within the port ring, thereby to adjust the distance between the end of the nozzle and the rotating (shock) tube. The mechanism of the present invention provides for a fine sliding adjustment of the nozzle or inner member within the port ring or outer member.

An object of this invention is to provide a novel mechanism for fine sliding adjustment of one member within or with respect to another member.

Another object is to provide a mechanism having sufficient strength for fine sliding adjustment of a relatively heavy member.

A further object is to provide an adjusting mechanism by means of which a fine adjustment of a heavy member may be achieved, while using only threads of relatively coarse pitch.

The objects of this invention are accomplished, briefly, in the following manner: For slidably adjusting an inner member within an outer member, a set of threads having a certain fairly coarse pitch is provided on the inner member, and a set of threads having a slightly different pitch is provided on the outer member (or on a housing rigidly secured to the outer member, which is to the same effect), both of these sets of threads being of the same "hand." A manually-rotatable nut has two sets of threads one of which corresponds to each respective one of the two sets of threads previously mentioned. The nut threadedly engages the two sets of threads, and by rotation of the nut a differential action is produced which causes the inner member to move with respect to the outer member. The nut carries around its circumference a scale which cooperates with a pointer secured to the fixed or outer member.

A detailed description of the invention follows, taken in conjunction with the accompanying drawing, wherein:

FIG. 1 is a generally vertical section through an adjusting mechanism according to the invention, a nozzle and a portion of a wave engine also being shown;

FIG. 2 is a partial cross-section, taken on line 2—2 of FIG. 1;

2

FIG. 3 is a sectional view taken on line 3—3 of FIG. 1; and

FIG. 4 is a partial top or plan view of the mechanism shown in FIG. 1.

Refer first to FIG. 1. At the left-hand end of this figure, there is shown a portion of a wave engine, including a stationary port ring 1 inside of which rotates, at a high angular velocity, a disc 2 which carries an elongated shock tube (not shown). Port ring 1 is positioned to extend in a generally vertical direction (having only a rather small thickness, measured in a direction perpendicular to the plane of the paper in FIG. 1), being mounted in any suitable manner on a floor or other supporting horizontal surface. For further details of the wave engine construction, reference may be had to my copending application, Serial No. 326,009, filed November 26, 1963.

Ring 1 has therein a radially-extending aperture 3 which is centered on the central horizontal diameter of the ring. Aperture 3 is approximately rectangular in outline, but has arcuate upper and lower boundaries (see FIG. 3). The longer dimension (e.g., this may be 1⅜ inches) of this approximately rectangular aperture 3 extends vertically in the plane of the paper in FIGS. 1 and 3, while the shorter dimension (e.g., this may be about 9/16 inch) extends horizontally in the plane of the paper in FIG. 3. Aperture 3 is the aperture for the driving gas supply nozzle of the wave engine, and, as disclosed in the aforementioned application, there may be another one of these apertures (not shown) at the diametrically-opposite side of the port ring 1.

In the aperture 3, there is mounted a nozzle 4. This nozzle is mounted for sliding movement (with a close sliding fit) in aperture 3, and may be thought of as an inner member which is slidably adjustable (in the direction of its length) within the outer stationary member which comprises port ring 1 and also other stationary elements to be described hereinafter. The nozzle 4 has at its inner end a rectangular cross-section with inside dimensions about ¼ inch by 1 inch, and opens into the interior of port ring 1, closely adjacent the periphery of disc 2. At a shoulder or junction 5, the square cross-section of nozzle 4 merges into a round or tubular cross-section.

A flange 6, carrying on its periphery a set of external threads 7, is secured as by welding at 8 to the outer face of ring 1. A housing 9 carries at its lefthand or inner end a set of internal threads which mate with threads 7, thereby to fasten housing 9 to flange 6. In assembly, the housing 9 is turned up quite tight on threads 7, thereby to rigidly secure the housing to the port ring-flange combination 1, 6. The outer or right-hand end of housing 9 has a smaller inside diameter than that at the left-hand or threaded end thereof, the former diameter being such as to accommodate therein the round or tubular extension 10 of nozzle 4. A pair of brass rings 11, one carried by each end of the smaller-diameter portion of housing 9, engage the outer surface of the nozzle extension 10. Thus, the right-hand end portion of housing 9 helps support the nozzle, and guides the latter in its longitudinal sliding movement. Housing 9, flange 6, and port ring 1 together comprise an outer member within which nozzle 4 slides.

Between the threaded end of housing 9 and the smaller-diameter portion thereof, housing 9 provides a chamber 12 in which is positioned a seal ring 13. Seal ring 13 contacts an O-ring 14 which is mounted in a groove at the right-hand or outer end of flange 6, and, when ring 13 is tightened against this O-ring, the former forces the latter tightly against the outer periphery of nozzle extension 10 to provide a seal therearound. Seal ring 13 is tightened against O-ring 14 by means of four equiangularly-spaced bolts 15 whose heads bear against the left-hand or inner face of flange 6 and which thread into tapped holes provided in seal ring 13.

At its extreme right-hand or outer end, housing 9 carries on its outer periphery a set of external threads 16 of fairly coarse pitch, e.g., eighteen threads per inch. A manually-operable adjusting nut 17, which is knurled on its outer surface and which is also provided with two or more holes such as shown at 18 for accommodation of a spanner wrench, has at one end a first set of internal threads 19 which match the threads 16 on housing 9. When the mechanism of this invention is assembled, threads 19 engage threads 16.

At its opposite end, nut 17 has a second set of internal threads 20 of a fairly coarse pitch which is different from the pitch of threads 16, 19 but of the same order of magnitude as this latter pitch. For example, the pitch of threads 20 may be twenty threads per inch. The nozzle extension 10 has on its outer periphery a set of external threads 21 which match the threads 20 on nut 17 and are arranged to mate therewith. The threads 21 are so located on nozzle extension 10 that, when the device is assembled, these threads will be beyond or to the right of housing 9.

The "hands" of the two sets of threads 20, 21 and 19, 16 are the same. That is to say, both sets of threads are right-hand threads, or in the alternative, both sets may be left-hand threads. It is pointed out that the diameter of threads 20, 21 is less than that of threads 16, 19.

When nut 17 is rotated through one revolution, there must be a relative linear movement of $\frac{1}{18}$ inch between housing 9 (the outer member) and nut 17, and there must be a relative linear movement of only $\frac{1}{20}$ inch between nut 17 and nozzle 4, 10 (the inner member). Since nut 17 is rigid and since housing 9 is rigidly secured to the large stationary member 1, 6 the only way in which the aforementioned requirements can be met is for nozzle 4, 10 to move through a distance equal to the difference between $\frac{1}{18}$ inch and $\frac{1}{20}$ inch, or about 0.0055 inch. This means, then, that a differential action takes place, and for each revolution of nut 17 the nozzle 4, 10 slides longitudinally (moves linearly) within housing 9, flange 6, and ring 1, a distance of about 0.0055 inch. The design is such that the total range of adjustment of nozzle 4, 10 is produced by two revolutions of the nut 17, this total range thus being approximately .001 inch.

To enable accurate measurement and/or setting of the position of nozzle 4, 10, a circumferentially-extending scale 22 (see FIG. 4) is inscribed on the periphery of nut 17, this scale cooperating with a pointer 23 which is secured by means of a machine screw 24 to the outside of the housing 9.

The outer end of tubular nozzle extension 10 is coupled to one end of a pipe 25 which extends to the driving gas reservoir (not shown) for the wave engine. This last-mentioned coupling is effected by means of the mating bolted-together flanges 26 and 27, one of which is carried by the nozzle extension 10 and the other of which is carried by the pipe 25.

The invention claimed is:

1. Mechanism for slidably adjusting a first member with respect to a second member, comprising means providing threads having a first pitch on said first member, means providing threads having a second pitch different from said first pitch, but of the same order of magnitude, on said second member, the hands of the threads having said first pitch and of the threads having said second pitch being the same; and an adjusting nut threadedly engaging said first-mentioned threads and also said second-mentioned threads, said nut having one set of threads with said first pitch, for engaging said first-mentioned threads, and another set of threads with said second pitch, for engaging said second-mentioned threads.

2. In a wave engine having a driving gas nozzle and a stationary port ring and wherein said nozzle is to be slidably adjusted with respect to said ring: mechanism for adjusting said nozzle with respect to said ring, comprising a set of threads having a first pitch on said nozzle, means providing threads having a second pitch different from said first pitch, but of the same order of magnitude, on said ring, the hands of the threads having said first pitch and of the threads having said second pitch being the same; and an adjusting nut threadedly engaging said first-mentioned threads and also said second-mentioned threads, said nut having one set of threads with said first pitch, for engaging said first-mentioned threads, and another set of threads with said second pitch, for engaging said second-mentioned threads.

References Cited by the Examiner
UNITED STATES PATENTS

| 861,828 | 7/1907 | Grindrod | 285—175 |
|---|---|---|---|
| 2,690,695 | 10/1954 | Coates | 116—117 |

LOUIS J. CAPOZI, *Primary Examiner.*